United States Patent
Mazzocchi et al.

(10) Patent No.: US 7,828,323 B1
(45) Date of Patent: Nov. 9, 2010

(54) AIR BAG DEPLOYMENT CHUTE AND METHOD

(75) Inventors: Nicholas A. Mazzocchi, Canton, MI (US); Kenneth J. Kwasnik, Shelby Township, MI (US); Brian C. Slane, Flatrock, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 0 days.

(21) Appl. No.: 12/845,807

(22) Filed: Jul. 29, 2010

Related U.S. Application Data

(62) Division of application No. 12/264,304, filed on Nov. 4, 2008, now Pat. No. 7,784,820.

(51) Int. Cl.
  B60R 21/205 (2006.01)
  B60R 21/215 (2006.01)
  B29C 65/08 (2006.01)

(52) U.S. Cl. ............... 280/732; 280/728.3; 156/73.5; 156/73.6

(58) Field of Classification Search ............ 280/728.3, 280/728.2, 730.2, 731, 732; 156/73.5, 73.6; 228/2.1; 264/68; 73/850; B60R 21/205, B60R 21/215
See application file for complete search history.

(56) References Cited

U.S. PATENT DOCUMENTS

| | | | |
|---|---|---|---|
| 6,039,342 A | 3/2000 | Sasaki | |
| 6,394,485 B1 | 5/2002 | Amamori | |
| 6,467,801 B1 | 10/2002 | Preisler et al. | |
| 6,494,481 B2 | 12/2002 | Yasuda | |
| 6,595,543 B2 | 7/2003 | Desprez | |
| 6,601,870 B2 | 8/2003 | Suzuki et al. | |
| 6,860,505 B2 | 3/2005 | Yasuda et al. | |
| 7,007,970 B2 | 3/2006 | Yasuda et al. | |
| 7,093,847 B2 | 8/2006 | Hurst | |
| 7,178,825 B2 | 2/2007 | Fuji et al. | |
| 7,188,860 B2 | 3/2007 | Hayashi | |
| 7,229,095 B2 | 6/2007 | Nishijima et al. | |
| 7,232,151 B2 | 6/2007 | Hayashi et al. | |
| 7,234,724 B1 | 6/2007 | Cowelchuk et al. | |
| 7,275,759 B2 | 10/2007 | Sawada | |
| 2004/0026902 A1 | 2/2004 | Yasuda et al. | |
| 2007/0040359 A1 | 2/2007 | Chen et al. | |
| 2007/0045994 A1* | 3/2007 | Preisler | 280/728.3 |
| 2007/0045995 A1 | 3/2007 | Adler et al. | |

* cited by examiner

*Primary Examiner*—Paul N Dickson
*Assistant Examiner*—Keith Frisby
(74) *Attorney, Agent, or Firm*—Mark L. Mollon; MacMillan, Sobanski & Todd, LLC

(57) ABSTRACT

An integrated air bag support structure that includes a support base for attachment to the rear side of a substrate. The support base is configured to surround a door support panel and both are configured for attachment to the rear side of a substrate in an area that is pre-weakened to define an air bag deployment door in a vehicle instrument panel or a steering wheel air bag module. The upper surfaces of the support base and door support panel are attached to the rear surface of the substrate, and a test tab extends from the base that is attached to the rear surface of the substrate in the same manner as the support base and the door support panel. The test tab has an unattached extension portion for the purpose of gripping and pulling to test the integrity of the attachment without affecting the attachment of the support panel.

7 Claims, 4 Drawing Sheets

AIR BAG DEPLOYMENT CHUTE AND METHOD

CROSS-REFERENCE TO RELATED APPLICATIONS

This application is a division of copending U.S. application Ser. No. 12/264,304, filed Nov. 4, 2008, entitled "Air Bag Deployment Chute."

BACKGROUND OF THE INVENTION

1. Field of the Invention

This invention relates to the field of air bag deployment systems for an automotive vehicle and more particularly to the area of an air bag chute structure.

2. Description of the Related Art

In this technology field, there have been several attempts to provide a passenger air bag chute integrated with a hinged deployment door and a support structure for underlying a vehicle interior panel.

U.S. Pat. No. 6,467,801 describes an air bag deployment chute with a hinge member that is attached between the door and a base reinforcement portion that surrounds the door.

U.S. Pat. No. 7,178,825 describes several embodiments of an air bag deployment chute. Several embodiments show an integral structure that contain windows for interconnecting with hooks extending from an air bag container. Other embodiments show add-on reinforcements to the windows.

U.S. Pat. No. 7,275,759 shows a multi-piece air bag chute with side windows that are formed to collapse during air bag deployment and allow portions of the chute and outer cover to move outwards from the container during air bag deployment.

BRIEF SUMMARY OF THE INVENTION

The inventive concept is directed to an improved method and apparatus, for use in an air bag deployment system, that includes an air bag deployment structure and chute formed to have reinforcing members to maintain a rectangular chute opening during air bag installation and to prevent separation of the chute from the air bag container due to tear-through of windows during air bag deployment.

The inventive concept includes an integrated structure with a support base for attachment to the rear side of a vehicle interior substrate. The support base is configured to surround a door support panel for attachment to the rear side of the substrate in an area that is pre-weakened to define an air bag deployment door in a vehicle instrument panel or a steering wheel air bag module. A rectangular air bag chute tube extends downward from the support base and contains a plurality of skirt walls for surrounding an air bag container and to define the path for deployment of the air bag from the air bag container. The door support panel is generally co-planar with the support base when attached to the substrate, but is separated from the support base by a gap on all four sides. A hinge element extends between one of the skirt walls of the air bag chute tube and one edge of the door support panel, and includes a pair of pivoting elements and an arm extension. The skirt walls of the chute form a rectangular opening opposite the door support panel for accepting insertion of the air bag container during assembly. Windows are provided in at least one skirt side wall of the chute for receiving hooks that extend from the air bag container. In addition, strengthening bars are formed beneath the windows and adjacent the chute opening. The strengthening bars function to maintain the rectangular shape of the chute opening during assembly with the air bag container and to subsequently prevent contact between the larger chute and the smaller air bag container that would otherwise cause noise during vehicle operation, due to vibrational contact. The strengthening bars also prevent the chute from becoming detached from the air bag container hooks by providing added mass to the skirt wall below the windows.

Therefore, it is an object of the inventive concept to provide an improved energy management method and system for an air bag deployment system that reduces the energy present on the door member during air bag deployment and the resultant forces which may otherwise cause separation of the air bag chute from the air bag container.

It is another object of the inventive concept to provide an improved air bag chute that is integrated in structure with reinforcement bars below the skirt wall windows.

It is a further object of the inventive concept to provide a method of making an integrated structure that embodies the claimed features.

A more complete description of an embodiment of the inventive concept is presented below.

DETAILED DESCRIPTION OF THE INVENTION

Figure 1:
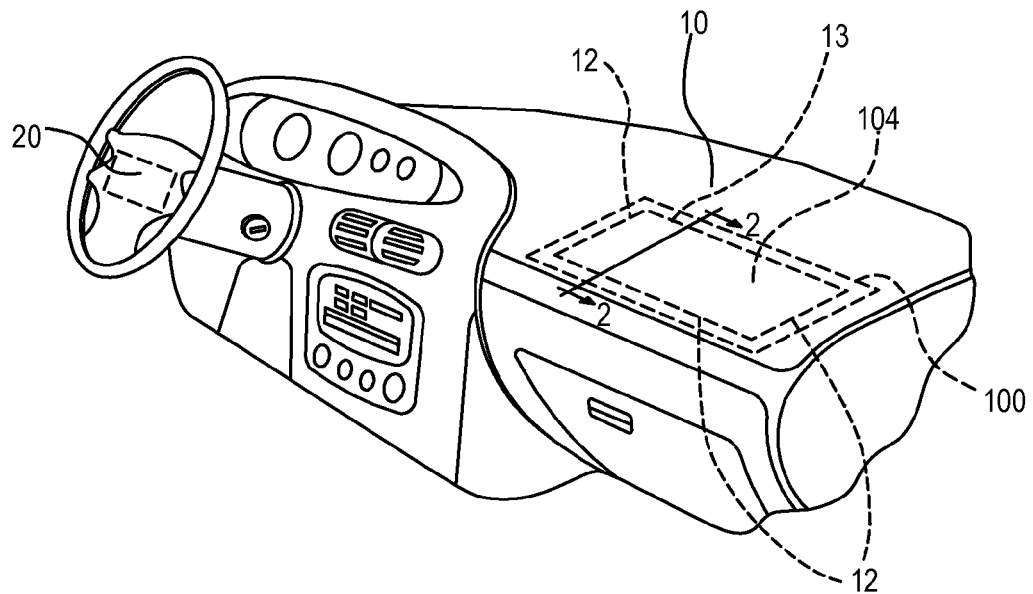
FIG. 1 is a perspective view of a vehicle instrument panel illustrating air bag deployment areas in which the present inventive concept may be employed.

FIG. 1 represents a typical vehicle instrument panel 10 into which the inventive concept may be installed. Additionally, the inventive concept is suitable for inclusion in a steering wheel air bag module 20.

Figure 2:
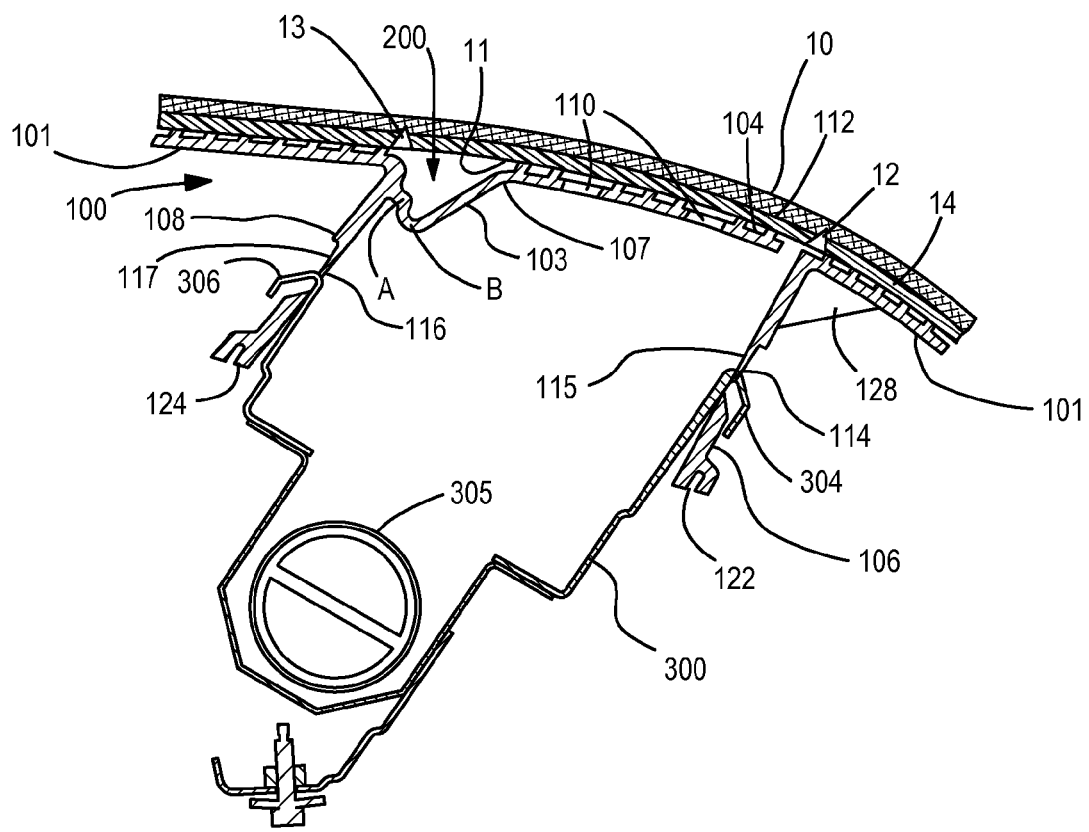
FIG. 2 is a cross-sectional plan view taken along section line 2-2 in FIG. 1, which shows an embodiment of the inventive concept connected to a substrate and an air bag container assembly.
Figure 3:
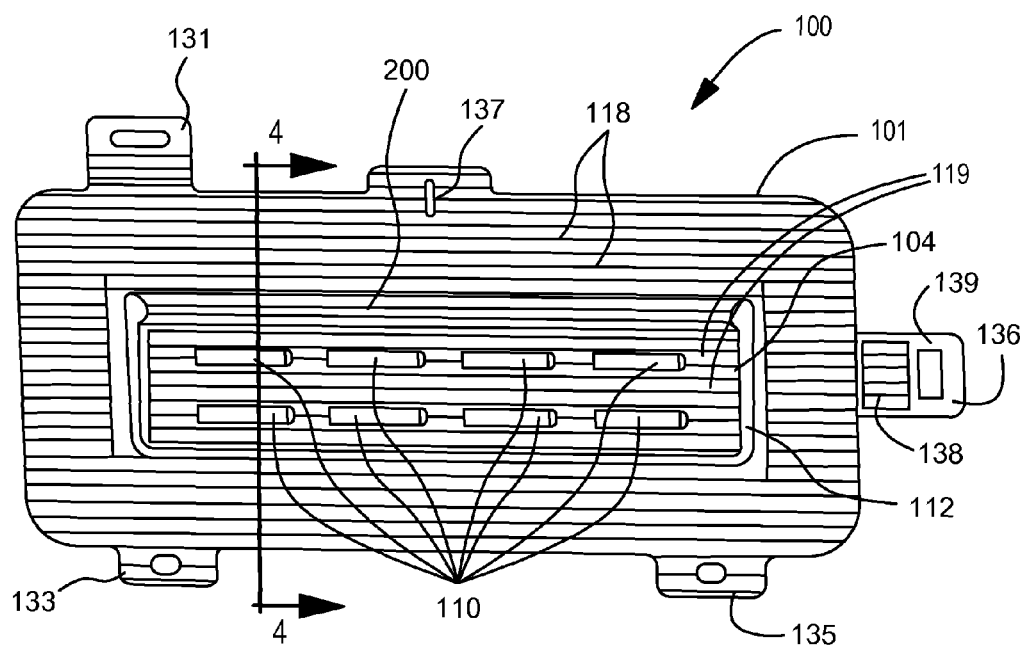
FIG. 3 is a top plan view of an embodiment of the inventive concept prior to installation in a vehicle air bag deployment system.
Figure 4:
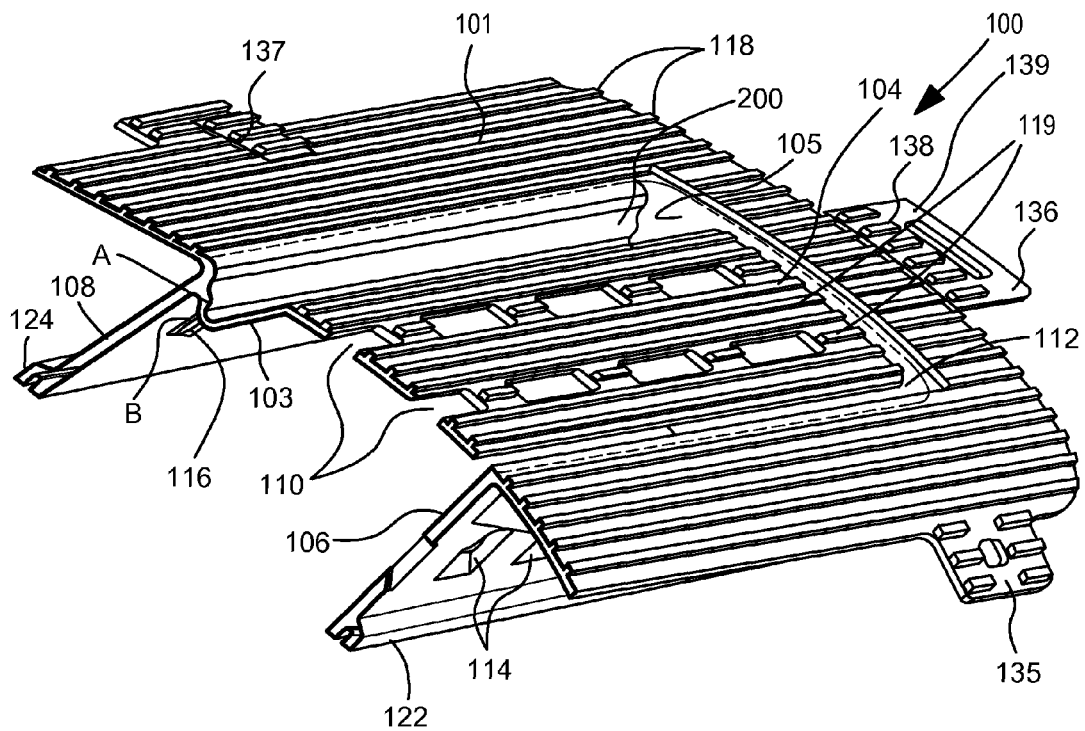
FIG. 4 is a cross-sectional perspective view taken along section line 4-4 in FIG. 3
Figure 5:
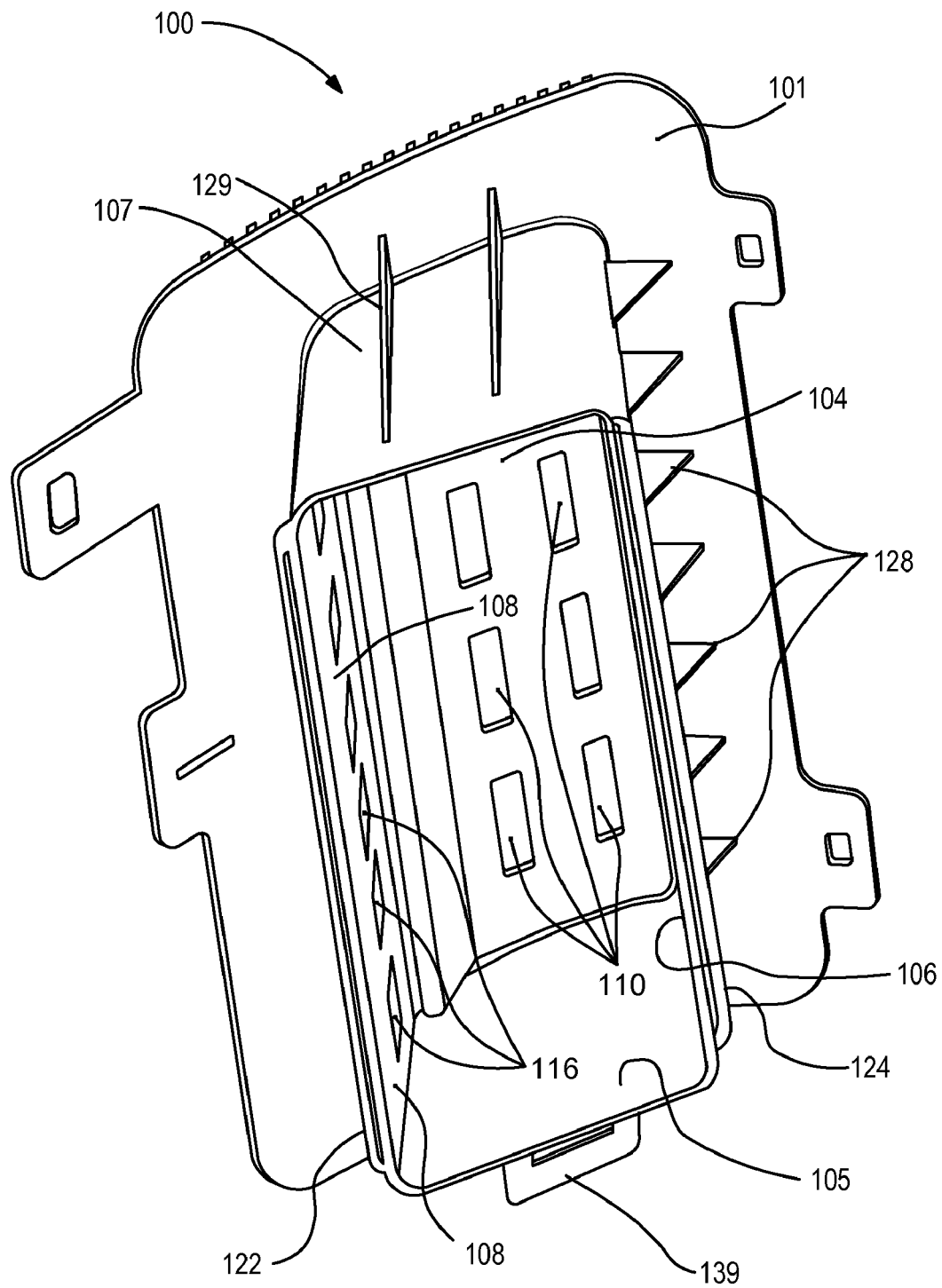
FIG. 5 is a perspective bottom view of the embodiment shown in FIGS. 3 and 4.
Figure 6:
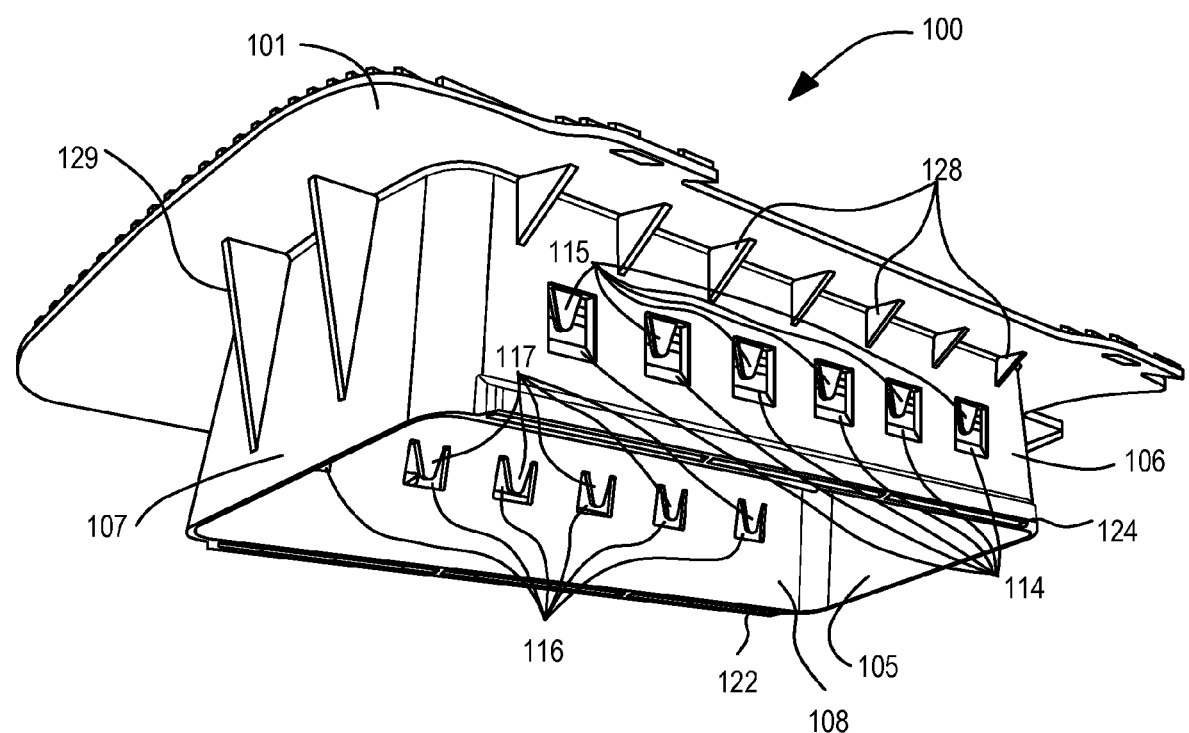
FIG. 6 is another perspective bottom view of the embodiment shown in FIGS. 3-5.

In FIGS. 2, 3 and 4, the support base 101 of air bag deployment structure 100 is shown to have upper and lower surfaces. The upper surface of support base 101 contains a plurality of welding ribs 118 to facilitate attachment to the lower surface 11 of substrate 14 with a vibration welding process. (Of course other types of attachment such as ultrasonic welding, adhesives and other commonly known techniques may be acceptable substitutes, provided they preserve the energy absorbing characteristics described herein.) A door support panel 104, containing welding ribs 119, is also attached to the lower surface 11 of substrate 14, but within an area defined as the air bag deployment door by the pre-weakened seams 12 and 13. In this configuration, the door tear seam 12 is pre-weakened to the extent that the outer surface of instrument panel 10 and the substrate 14 will completely rupture upon deployment of the air bag. Seam 13 is a hinge seam and is formed to provide a pivot point for the substrate and outer skin of the instrument panel 10. Therefore it may be pre-weakened to a lesser extent than door seam 12.

The air bag deployment structure 100 is formed as a one piece molding of a flexible material such as Dexflex® by Solvay Engineered Polymers, (a "thermoplastic olefinic elastomer (TPO)"), or other material that exhibits equivalent or superior ductility at very cold temperatures at least to −30° C. and good toughness at high temperatures at least to 90° C. Other materials such as TPO (Thermoplastic Olefin), TPE (Thermoplastic Elastomer or TEO (Thermoplastic Elastomer Olefin) could be substituted. It is believed that various pieces could be separately formed and joined together to replicate the one piece molded embodiment. If that is done, care will have to be made in order to obtain the energy management that is offered by the integration of the various elements that make up the disclosed structure.

Support base 101 is a generally planar flange that is substantially coplanar with the door support panel 104. As shown in the figures, there is a slight curvature that is intended to correspond to the substrate surface to which the structure attaches. Such a substrate could be curved or perfectly flat. For purposes of this discussion, the support base 101 and the door support panel 104 are described as generally planar to mean that they are configured to be attached to the underside of the substrate 12 that is generally smooth and continuous.

In the depicted embodiment, an alignment slot 137 is provided in an extension from support base 101. Although not shown, the substrate 12 may have a protrusion formed therein and extending from its lower surface to provide a keying feature that assists in the correct placement of the support structure 100 prior to being welded to the substrate. Apertured tabs 131, 133 and 135, extending from support base 101, are used to accept other protrusions extending from the lower surface of substrate 12.

A test tab extension 139 is shown as having deformable ribs 138 that are identical in content to deformable ribs 118 and 119 for attachment to the corresponding lower surface area of the substrate 12 during the same vibration welding process. The test tab extension 139 allows the welding vendor, the assembler, or subsequent customer to grip the unattached extension portion 136 while performing quality control testing by applying a pull pressure to the tab and thereby ensure that the entire weld of the support structure 100 to the substrate is of the same quality.

Door support panel 104 and support base 101 are separated by a gap 112 so that door support panel 104 is not directly attached to the support base 101. The support base 101 extends under the pre-weakened door seams 12 and 13 and therefore provides resistance to inward pressures that may be applied to the outer surface of the instrument panel 10. In the depicted embodiment, several apertures 110 are shown in door support panel 104. Apertures 110 are positioned to reduce the mass of the door support panel 104 without affecting its support or attachment properties.

An air bag chute tube is formed by skirt walls 105, 106, 107 and 108 which extend downward from support base 101. In this embodiment, the air bag chute tube has a rectangular configuration defined by end skirt walls 105 and 107, and side skirt walls 106 and 108. Angle gussets 128 and 129 are spaced along the outside of the skirt side and end walls to provide added strength and some rigidity between the support base 101 and the air bag chute tube.

A hinge element 200 extends between the side skirt wall 108 and hinge edge 107 of door support panel 104. Hinge element 200 includes respective first and second pivoting elements "A" and "B" and an arm extension 103. From the end, it can be seen that the first pivoting element A is formed with a downwardly directed curve having one end connected to the inner side of side skirt wall 108 and the other end connected to said second pivot element B. The second pivot element B is formed with an upwardly directed curve having one end connected to the first pivot element A and the other end connected to extension arm 103. Extension arm 103 extends upwards from second pivot element B to a hinge edge 107 of said door support panel 104. Each pivot element is an axial extension substantially parallel to each other and to the edge of the door panel to which the arm extension 103 is connected. Each pivot element, as well as arm extension 103, extends approximately the full length of the hinge edge 107.

The longer side skirt walls 108 contain several window apertures 114 and 116 for engagement with a corresponding number of attachment hooks extending from an air bag container (not shown). Window apertures 114 and 116 have pressure tabs 115 and 117 that bear against the inserted hooks to tighten the engagement connections and prevent rattling from occurring between the air bag container and the air bag chute during vehicle operation, prior to air bag deployment.

The lower portions of the side skirt walls 108, below the windows 114 and 116, contain reinforcement bars 122 and 124. Reinforcement bars 122 and 124, in the depicted embodiment, are formed on the edge of the chute opening and in effect double the thickness of the side skirt wall material at the chute opening. Reinforcement bars 122 and 124 are formed along the entire length of side skirt walls 108 and function to maintain the sides of the chute parallel during assembly of the air bag container to the chute. By maintaining the chute side walls parallel, there is less opportunity for noise vibration to be generated between the air bag module and the chute over the life of the undeployed unit.

The bars also prevent air bag container hooks from completely tearing through the side skirt walls from their positions in the windows 114 and 116 when the air bag is deployed. During air bag deployment, severe pressure is initially present within the air bag container and chute due to the explosive gases that are generated. Because the air bag container is fixed to the structure of the vehicle, the air bag container hooks serve to prevent separation of the air bag support structure 100 and the instrument panel from their intended locations during air bag deployment. The air bag container hooks interact with side skirt walls 106 and 108 below the windows 114 and 116 to contain the pressure and allow the chute to remain intact, while the pressure is directed to the door support panel 104. The directed pressure forces the tear seams 12 to rupture and the air bag to deploy. Some prior art applications use metal side walls in air bag chutes to prevent tearing. In the described embodiment where a thermoplastic material, such as noted above, is molded to form an integrated structure 100, the double thickness strengthening bars 122 and 124 combine with the side walls 108 and 106 to prevent the hooks from completely tearing through the skirt walls and do not allow separation of the air bag support structure 100.

It can be seen from the drawings and accompanying explanation, that the present inventive concept is a unique improvement over conventional air bag deployment support structures and methods of managing deployment energy. And while the embodiment shown here is a preferred embodiment, it shall not be considered to be a restriction on the scope of the claims set forth below.

We claim:

1. A method of assembling an air bag deployment system of an automotive vehicle, comprising the steps of:

providing an air bag deployment structure that includes a support base for attachment to the rear surface of an occupant facing substrate;

providing said support base with upper and lower surfaces configured to surround a defined air bag deployment door in said substrate, said upper surface of said support base being configured to be substantially continuously attached to said rear surface of said substrate;

providing a test tab having a first portion adjacent to and extending from said support base and a second gripping portion extending outward from said first portion, wherein said first portion is also attached to said rear surface of said substrate along with said upper surface of said support base, and wherein said second portion is not attached to said substrate;

providing an air bag chute extending downward from said support base and containing a plurality of skirt walls for surrounding an air bag container and defining the path for deployment of the air bag from beneath said substrate; and reinforcing at least one of said skirt walls to form and maintain a rectangular shaped opening for receiving said air bag container.

2. The method of claim 1 wherein said support base and said test tab are attached to said substrate by a vibration welding process.

3. The method of claim 1 wherein said step of reinforcing said skirt walls includes the step of integrally forming a pair of strengthening bars external to said skirt walls.

4. The method of claim 3 wherein said step of integrally forming a pair of strengthening bars includes the step of molding said support base, said chute, and strengthening bars of TPO material.

5. The method of claim 1 wherein said step of providing said air bag chute includes providing said chute with a plurality of windows spaced along at least one skirt wall to accept and retain hooks extending from said air bag container during assembly.

6. The method of claim 5 wherein said step of reinforcing said at least one of said skirt walls includes the step of providing a strengthening bar between said windows and said chute opening to extend continuously below said windows to prevent said hooks from becoming separated from said skirt wall during air bag deployment.

7. The method of claim 6 wherein said step of reinforcing said at least one of said skirt walls includes the step of reinforcing opposing skirt walls.

* * * * *